「」

US009695077B2

(12) United States Patent
Heimdal et al.

(10) Patent No.: US 9,695,077 B2
(45) Date of Patent: Jul. 4, 2017

(54) CONVERSION OF CLARIFIER TO SUCTION PIPE SYSTEM

(71) Applicant: Ovivo Inc., Montreal (CA)

(72) Inventors: Tor Heimdal, West Jordan, UT (US); John Vorwaller, Salt Lake City, UT (US)

(73) Assignee: Ovivo Inc., Montreal QC (CA)

( * ) Notice: Subject to any disclaimer, the term of this patent is extended or adjusted under 35 U.S.C. 154(b) by 85 days.

(21) Appl. No.: 14/859,164

(22) Filed: Sep. 18, 2015

(65) Prior Publication Data

US 2017/0081230 A1 Mar. 23, 2017

(51) Int. Cl.
*B01D 21/06* (2006.01)
*B01D 21/24* (2006.01)
*C02F 11/12* (2006.01)
*B01D 21/00* (2006.01)

(52) U.S. Cl.
CPC .......... *C02F 11/12* (2013.01); *B01D 21/0003* (2013.01); *B01D 21/06* (2013.01); *B01D 21/245* (2013.01); *C02F 2201/004* (2013.01)

(58) Field of Classification Search
CPC .... B01D 21/0003; B01D 21/06; B01D 21/14; B01D 21/18; B01D 21/245
USPC ................................ 210/528, 803; 29/401.1
See application file for complete search history.

(56) References Cited

U.S. PATENT DOCUMENTS

| 3,298,529 | A | * | 1/1967 | Longnecker | ........... | B01D 21/06 |
| | | | | | | 210/528 |
| 3,371,788 | A | * | 3/1968 | Smith | ..................... | B01D 21/14 |
| | | | | | | 210/528 |
| 3,800,955 | A | * | 4/1974 | Edgerton | ............... | B01D 21/06 |
| | | | | | | 210/528 |
| 3,926,805 | A | * | 12/1975 | Walker | ................. | B01D 21/245 |
| | | | | | | 210/519 |
| 4,069,150 | A | * | 1/1978 | Lodholz | ................. | B01D 21/06 |
| | | | | | | 210/528 |
| 4,193,877 | A | * | 3/1980 | Lillywhite | ............. | B01D 21/14 |
| | | | | | | 210/525 |
| 5,340,485 | A | * | 8/1994 | Bradley | ............... | B01D 21/245 |
| | | | | | | 210/528 |
| 5,830,356 | A | * | 11/1998 | Kauppila | ............... | B01D 21/06 |
| | | | | | | 210/528 |
| 2015/0166386 | A1 | * | 6/2015 | Vorwaller | .............. | B01D 21/06 |
| | | | | | | 210/528 |

* cited by examiner

*Primary Examiner* — Christopher Upton
(74) *Attorney, Agent, or Firm* — Thomas M. Freiburger

(57) ABSTRACT

In a wastewater treatment system, a suction duct clarifier is converted to a suction pipe clarifier without penetrating existing concrete at the base of the tank. An elevated sludge collection box is added, positioned on the center column to rotate with rake arms, and a series of sludge riser pipes extend from the rake arms up into the sludge collection box for sludge delivery by hydraulic pressure differential. A sludge discharge downpipe is provided within the center/influent column for delivery of sludge from the collection box, and at the bottom of this pipe, above the tank floor, the discharge pipe exits through an opening in the center/influent column. At the outside of this opening is a sludge transfer box that receives sludge exiting the discharge pipe and conveys it down through the existing floor opening and to the existing under-floor RAS return pipe.

4 Claims, 7 Drawing Sheets

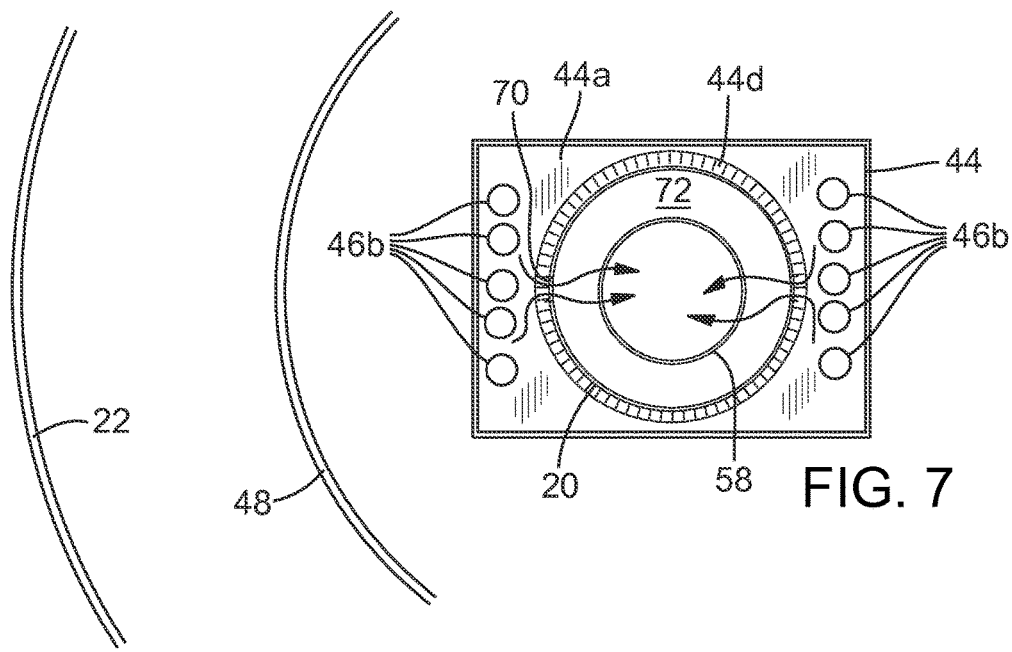
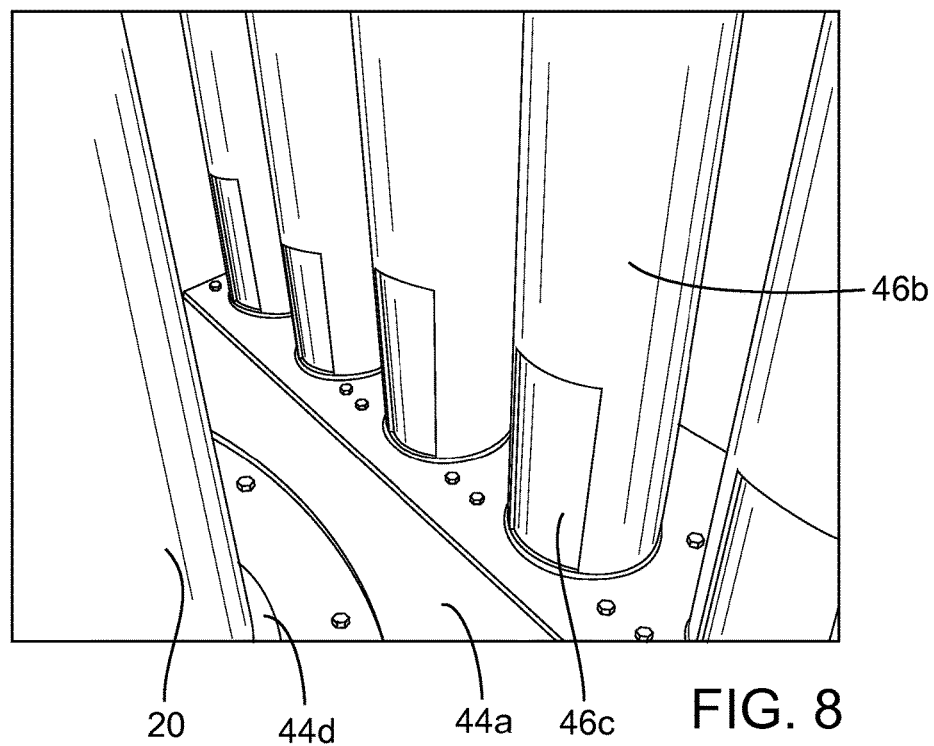

CONVERSION OF CLARIFIER TO SUCTION PIPE SYSTEM

BACKGROUND OF THE INVENTION

This invention is concerned with wastewater treatment systems. In particular, the invention encompasses a conversion of a suction duct clarifier to a suction pipe clarifier in an efficient manner without the need for penetrating the floor of the clarifier tank.

Suction duct clarifiers do not elevate sludge collected by the rake arms, but instead include horizontal pipes that convey raked sludge into a center sludge collection drum that surrounds the center influent column, is sealed against the column and rotates along with the rake arms. A floor opening is located within the annular space emcompassed by the drum, and this provides a vertical duct for movement of the sludge from the drum down below the floor to a horizontal RAS return pipe that conveys the sludge out of the clarifier. This pipe is under suction, so that suction exists in the sludge collection drum and draws the sludge to that drum from suction ducts supported by the rake arms.

On the other hand, suction pipe clarifiers include a series of sludge uplifting pipes on each rake arm, which include horizontal and vertical sections that deliver sludge ultimately to an elevated sludge collection box positioned around the center influent column. Raked and collected sludge rises up through these pipes and into the sludge collection box, by differential hydraulic pressure, since the liquid level in the sludge collection box is lower than the liquid level in the tank. The collection box rotates along with the rake arms, and is sealed against the exterior surface of the center influent column. The influent column includes in its outer wall at least one opening, usually four, through which sludge from the collection box flows inwardly into the center of the influent column where it is delivered into a sludge discharge downpipe. The sludge delivered to the downpipe does not mingle with influent wastewater rising up through the influent column.

The sludge travels down the vertical sludge discharge pipe, which at its lower end extends down into the concrete basin floor to connect with an under-floor RAS return pipe that conveys the sludge out and away from the clarifier. Typically a pump is provided outside the clarifier to establish suction to help withdraw this sludge through the RAS pipe.

A significant number of treatment plants have undertaken to convert an existing suction duct clarifier to a suction pipe clarifier. To accomplish this requires removal of the equipment, including the central influent column, from the concrete basin floor. Then, the concrete must be partly demolished to provide for a conduit flow path from a new vertical sludge discharge pipe, for downward flow of sludge and for connecting this pipe under the concrete surface to the existing horizontal RAS return pipe a few feet away that will convey the sludge out of the clarifier. This conversion is disruptive and expensive. All this is in addition to the addition of a new elevated sludge collection box such as described above, positioned on the center column and located centrally inside the clarifier's feedwell. This is accompanied by a series of sludge uplift pipes connected to the rake arms to allow raked sludge to be delivered into the elevated sludge collection box.

Many treatment plants have been hesitant to make this desirable conversion because of the disruption, time required, and high cost.

SUMMARY OF THE INVENTION

With the invention the suction duct/suction pipe clarifier conversion is made much more efficiently, with no need to penetrate existing concrete. A new sludge discharge vertical downpipe is provided in a center column/influent column, with a 90° elbow fixed to the bottom end of this pipe before reaching the tank floor. The elbow opening is oriented horizontally, and this is welded to a hole formed in the wall of the center column being installed, so that the RAS vertical discharge pipe is sealed to the column at that opening or exit port. A sludge transfer box or SRD (sludge return device) box of the invention is then secured to the outside of the center column surrounding the exit port of the downpipe, and this SRD box has a bottom that is directly over and sealed to the floor around the existing downward floor channel or conduit that was formerly used to withdraw sludge from the surrounding sludge collection drum of the existing suction duct system. Thus, an enclosed volume is created that includes both the downpipe elbow port and the floor opening.

In addition, the same changes are made that encompass a conventional conversion, with the components that are part of a suction pipe clarifier system. The elevated sludge collection box is added, surrounding the center column and within the feedwell and/or energy dissipating inlet. The collection box is a rotating component, rotating along with the rake arms and surrounding the center column. In the sludge collection box is a steel floor with a seal material at the central opening of the floor, so as to provide a moving seal against the outside of the center column. A series of preferably PVC pipes rise up from the rake arms into the sludge collection box and deliver the sludge due to a hydraulic head difference between the collection box and the outside liquid in the tank.

The sludge collection box, which is open to atmospheric pressure, must deliver the collected, elevated sludge into the new vertical sludge discharge downpipe that is concentrically located within the center influent column. Holes are made in the center column to allow flow, and these holes lead inwardly across an annular floor to the sludge discharge pipe for discharge. A doughnut-shaped plate forms this annular floor, welded into the center column to seal off the wastewater inflow (which is dispersed into the tank out through exit holes lower in the center column) from the location where the sludge moves from the sludge collection box to the vertical sludge discharge pipe.

It is therefore a principal object of the invention to enable an efficient and inexpensive conversion of a suction duct clarifier system to a suction pipe clarifier system, without disturbing the existing concrete floor of the clarifier basin. This and other objects, advantages and features of the invention will be apparent from the following description of a preferred embodiment, considered along with the accompanying drawings.

DESCRIPTION OF THE DRAWINGS

FIG. 7 is a schematic plan view, partially in section, showing an elevated sludge collection box and associated components which are part of the clarifier conversion.

FIG. 8 is a perspective view showing a portion of the interior of the sludge collection box.

DESCRIPTION OF PREFERRED EMBODIMENTS

Figure 1:
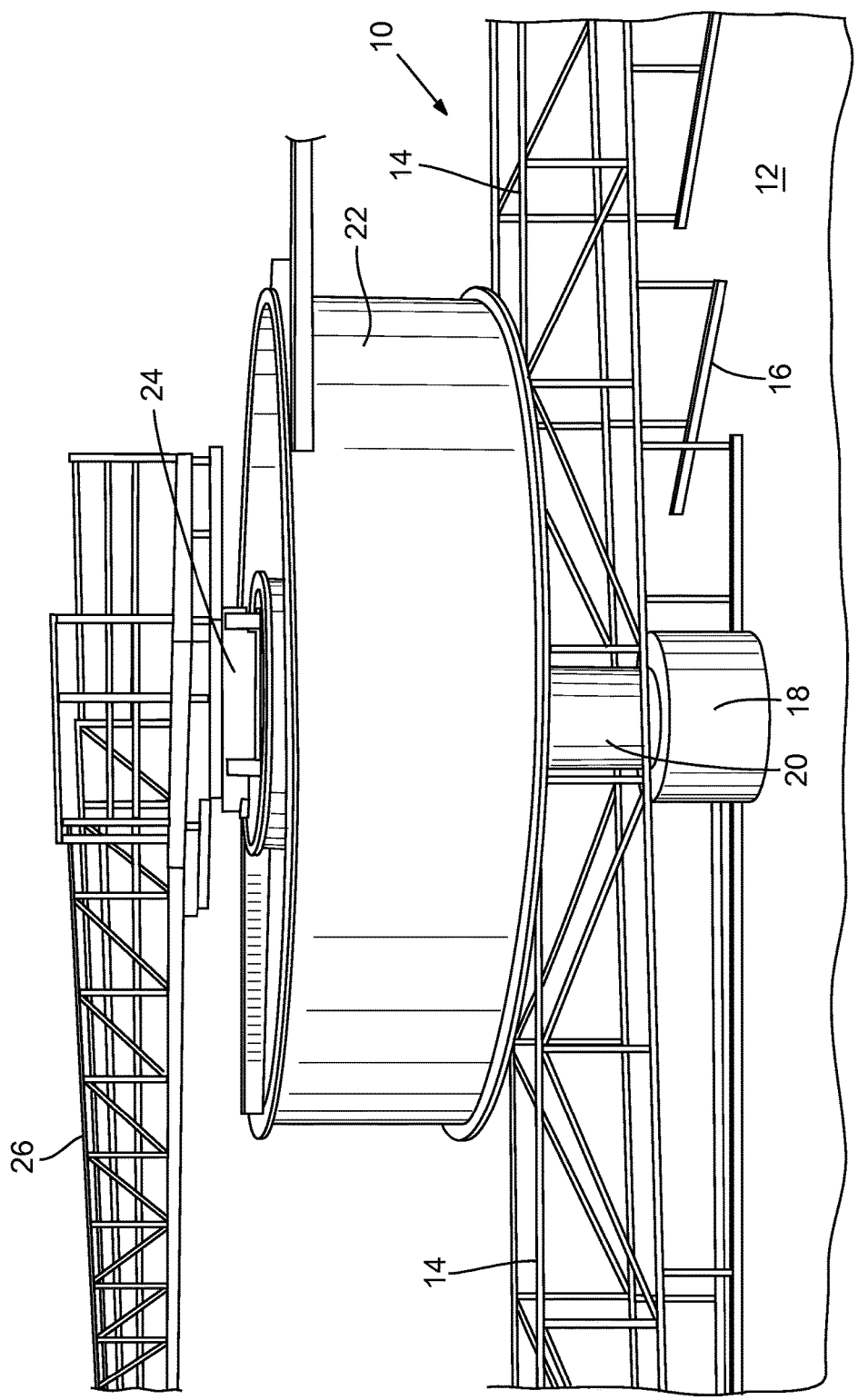
FIG. 1 is a perspective view showing components of a prior art suction duct clarifier system.

FIG. 1 is a perspective view showing, in part, a suction duct clarifier system 10 of the prior art, of the type which can be converted to a suction pipe clarifier system according to the invention. The drawing shows a clarifier basin floor 12, rake arms 14 that rotate and include rakes 16 that rake sludge along the basin floor, a sludge collection manifold and drum 18 at the base of a center column 20, the drum 18 being rotatable along with the rake arms, a large feedwell 22 above the rake arms (rotatable or stationary), and a drive unit 24 at the top of the center column, for rotating the movable components. A foot bridge is also indicated at 26, for access to the drive unit and other central components for maintenance. Below the rakes 14 is a sludge suction duct (not shown) that conveys the raked sludge to the sludge collection drum 18, where the sludge collects to be discharged out through a discharge port in the floor. The collection drum 18 is rotatable and has seals engaging against the floor (the term "floor" as used herein includes a floor plate, where present) and against the center column 20.

Figure 2:
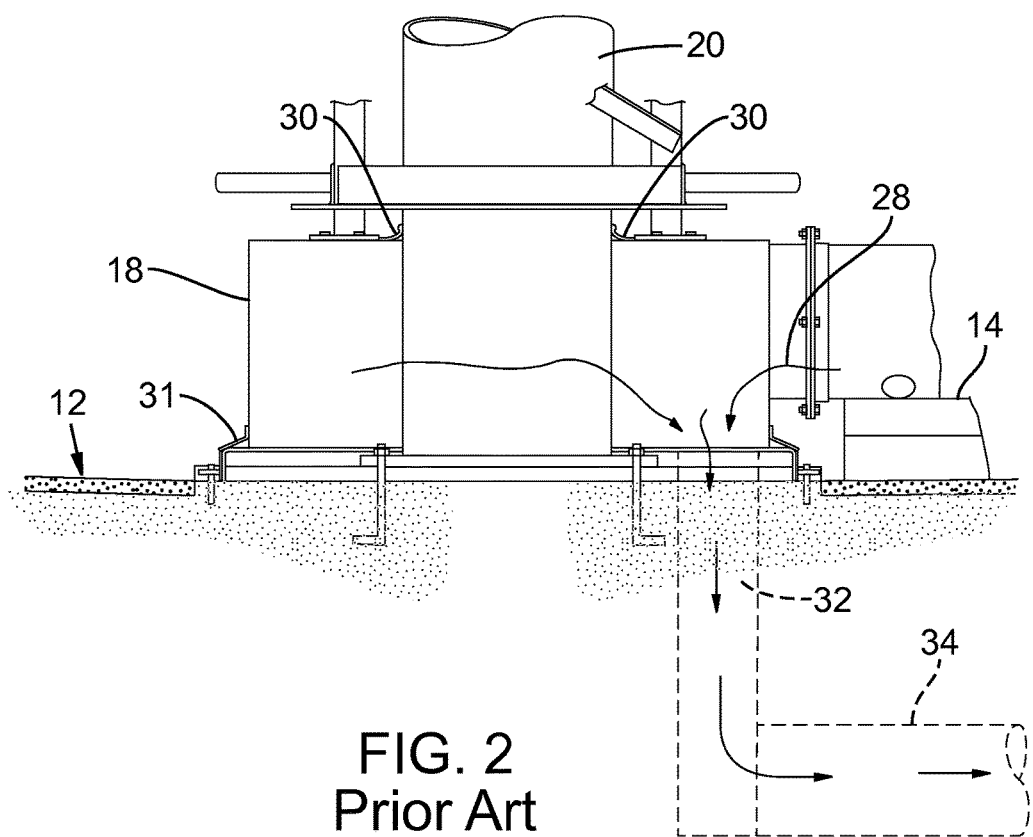
FIG. 2 is a schematic elevation view showing the center column and a sludge collection device of the prior art suction duct clarifier.

FIG. 2 is a schematic elevation view showing some of the components at the base of the center column 20. The sludge collection drum 18 surrounds the center column and is sealed against the column at seals 30, and also sealed at 31 against the basin floor 12. A rake arm 14 is indicated at right, and sludge flow via a suction duct from the rakes into the drum 18 is indicated schematically at 28. The interior of the drum 18 is under suction, which draws the sludge into the drum.

The collected sludge inside the drum 18 is discharged at 32, through a floor port. The sludge descends to a RAS return (exit) pipe 34, to be delivered out of the clarifier. A pump, not shown, typically is located outside the clarifier, drawing suction on the RAS return pipe 34 and thus to the drum 18.

Figure 3:
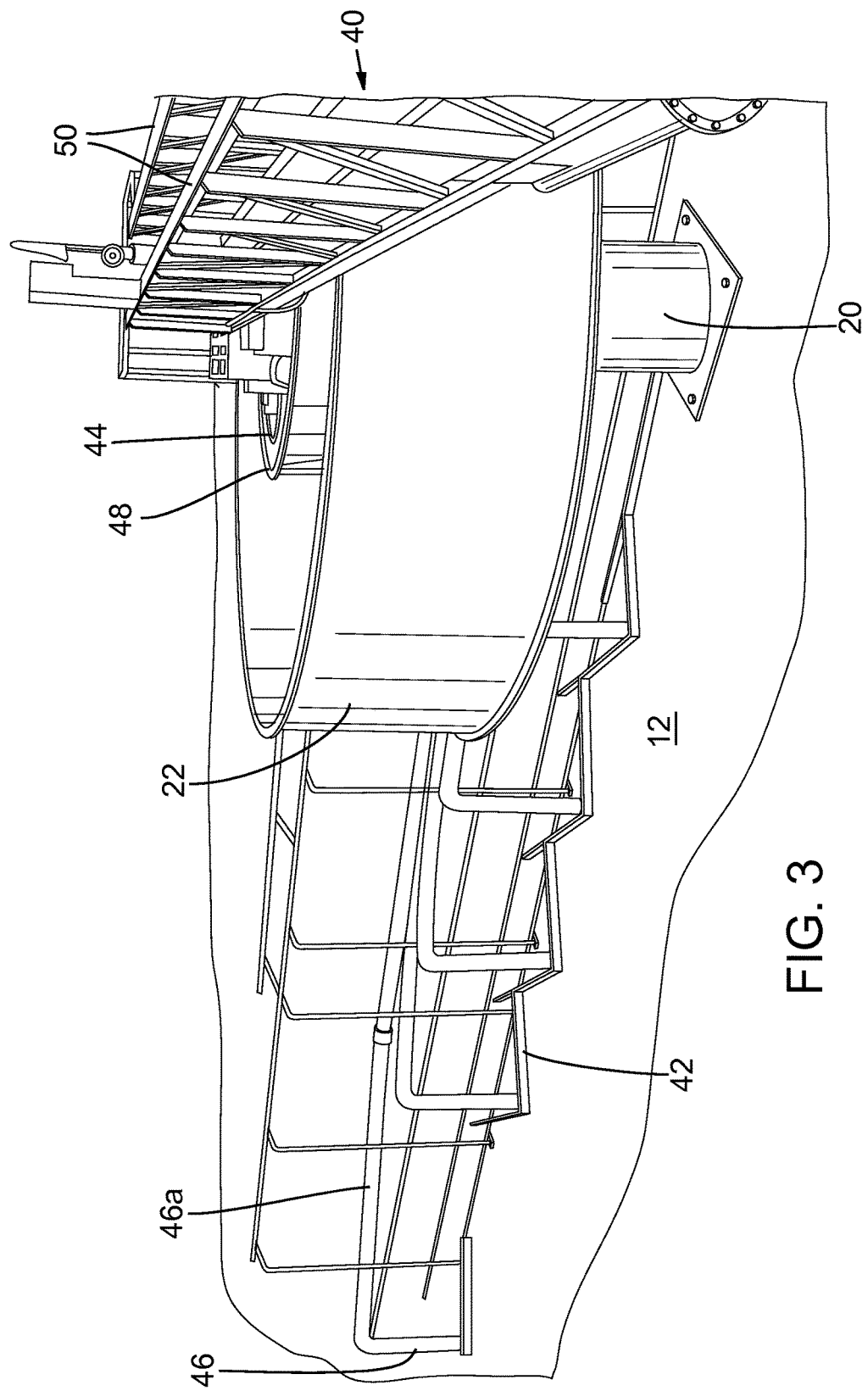
FIG. 3 is a perspective view showing a portion of a suction pipe clarifier system.

FIG. 3 shows a portion of a suction pipe clarifier 40 which is the object of the conversion described herein. FIG. 3 shows the general layout of this type of clarifier system. Instead of transferring sludge from the rakes 42 with horizontal pipes just above the basin floor to a central collection drum at the floor, this type of clarifier omits the collection drum, and the raked sludge flows up to an elevated sludge collection box 44. An outer edge of the collection box can be seen in the drawing, the box being preferably rectangular in shape. The sludge arrives via a series of sludge lift pipes 46, rising from positions adjacent to the rake arms and then through horizontal pipe sections 46a and then upwardly to the interior of the sludge collection box 44, up through the floor of the box. In FIG. 3 a feedwell is shown at 22, a center column at 20, and the edge of a infeed dispersion well or EDI (energy dissipating inlet) is seen at 48, concentric with the center column and the feedwell. A foot bridge is seen at 50.

Figure 6:
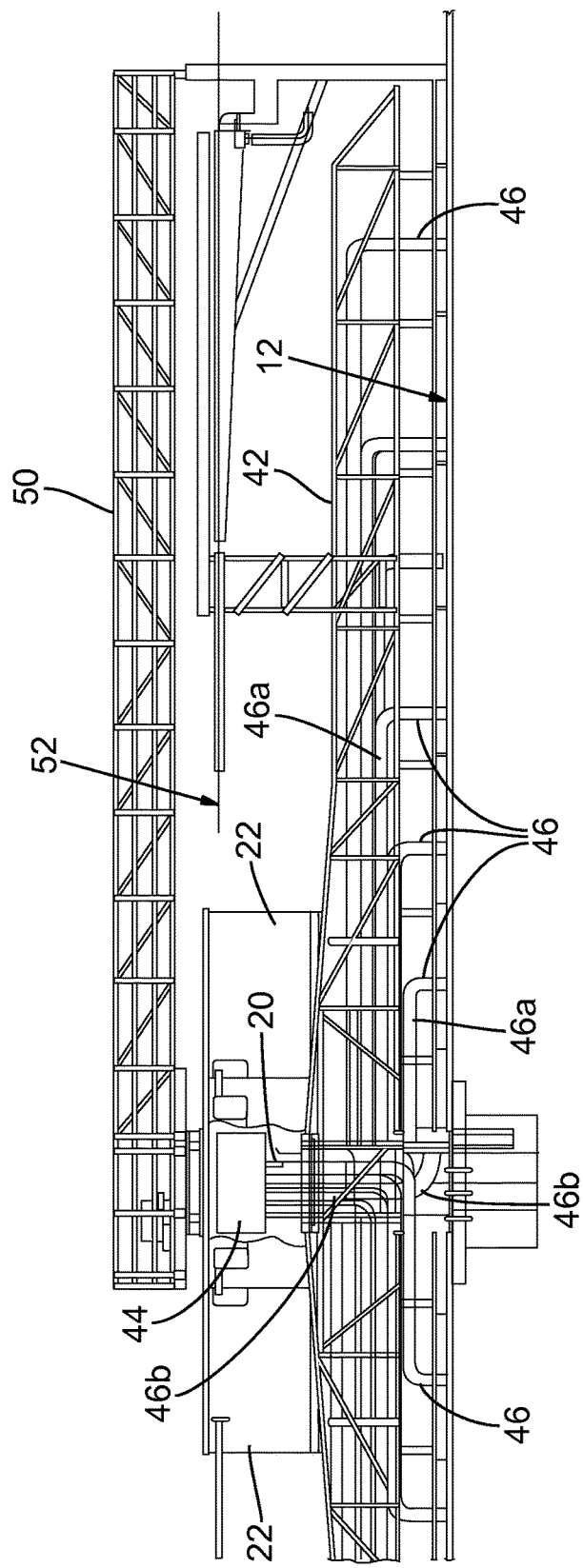
FIG. 6 is an elevation view showing a clarifier converted according to the invention, with most of the width of the clarifier illustrated.

FIG. 6 (showing a converted clarifier of the invention) also shows many of these components. The sludge collection box 44, preferably rectangular, is shown at an elevated position, surrounding the center influent column 20 and rotatable with the rake arms 42. The sludge riser pipes are shown at 46, 46a, and these pipes ascend at 46b up into the sludge collection box 44 as discussed above. In FIG. 6 the liquid surface is indicated at 52. An upright cage, typically five feet square, is not clearly seen in the drawing but typically surrounds the center/influent column and is secured to and rotatable with the rake arms.

With the conversion according to the invention, the sludge collection box 44 is added, as are the sludge transfer/lift pipes 46. Sludge flows by differential hydraulic pressure, from the bottom of the basin up through the pipes 46 to the sludge collection box 44, with a liquid level inside the box that is below the liquid level 52 in the tank.

Figure 4:
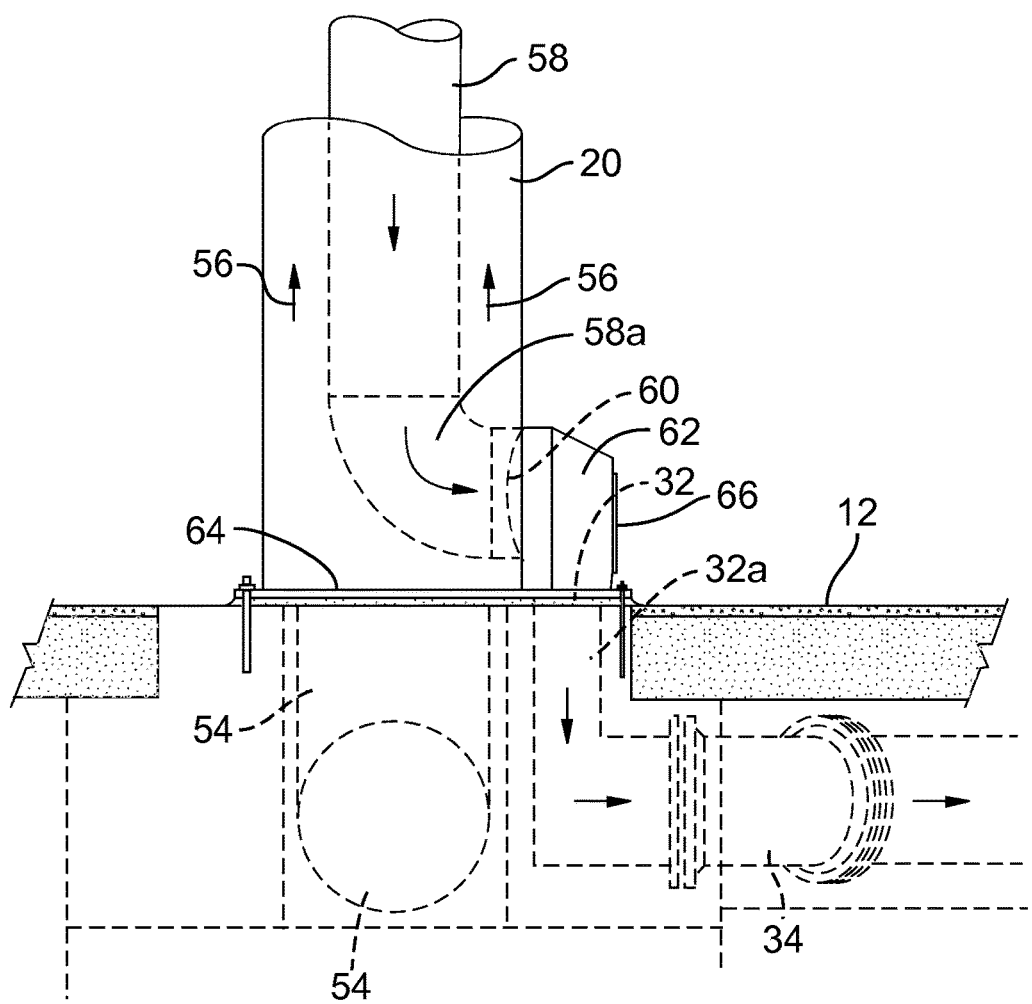
FIG. 4 is a schematic elevation view, partially in section, showing a conversion according to the invention, from a suction duct clarifier to a suction pipe clarifier, illustrating the connections and flow at the bottom of the central center column.

FIG. 4, a schematic elevation view, shows an important feature of the conversion method and system of the invention. The center column, which is the influent column 20, receives influent wastewater from an under-floor influent pipe indicated at 54. The pipe rises to the floor level, and from there the influent rises up through the center influent column as indicated by arrows at 56. The invention includes placement of a new sludge discharge downpipe 58 into the center of the influent column, as shown. The original center/influent column will normally be replaced by a larger-diameter column 20 with this conversion, to provide adequate influent sludge flow area given the presence of the discharge pipe 58. This discharge pipe, which can be, for example, a 24" pipe within a 48" infuent column, has an elbow 58a at its bottom end, and it terminates at or extends through a circular hole 60 which is formed in the wall of the column 20. The end of the discharge pipe 58, 58a is secured and sealed to the influent column opening 60, preferably by welding.

Figure 5:
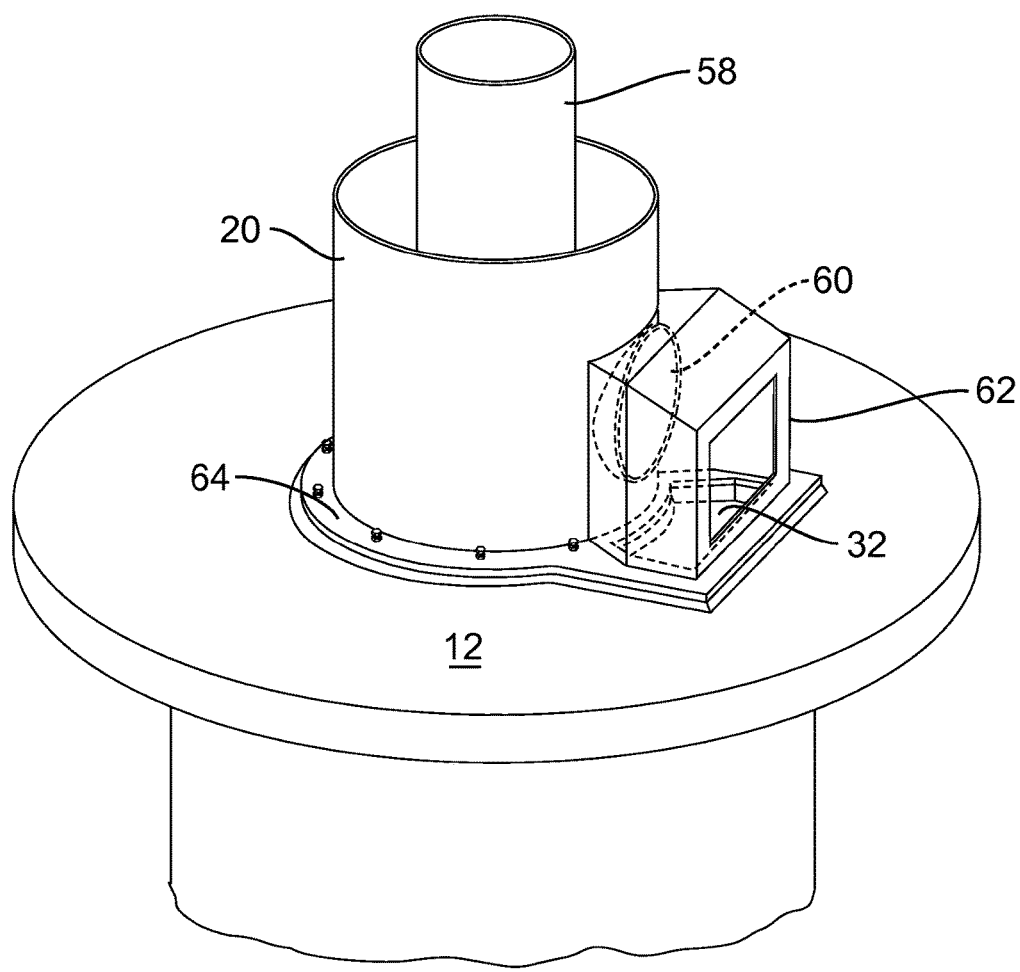
FIG. 5 is a simplified perspective view showing a portion of the center column and connections at the base end of the column, in the conversion according to the invention.

The invention takes advantage of the existing floor port 32 of a suction duct clarifier for outflow of sludge from the clarifier, without the need to penetrate the existing basin floor 12. A sludge return device (SRD) or box 62 is provided at exterior of the center column 20 and fixed into place on a base plate 64. This SRD 62, as also shown in the schematic perspective of FIG. 5, is sealed against the exterior of the column as well as against the floor, i.e. the base plate 64. FIG. 5 shows that the floor port 32 typically is somewhat box-shaped, with a configuration that may contour to the center column 20. The SRD 62 preferably is a metal box contoured to fit closely against the exterior of the center column 20, and it may have a removable plate at 66 for maintenance (shown removed in FIG. 5).

With the conversion of the invention, the suction duct clarifier becomes a suction pipe clarifier, in which raked sludge is elevated to the sludge collection box 44, then flows inwardly through a wall of the influent column to the discharge pipe or downpipe 58. From there it flows down the pipe 58 and is directed by the SRD 62 of the invention down through the existing floor port 32, down through an existing subfloor channel 32a and to the existing subfloor sludge return pipe 34. Again, suction may be applied from an exterior pump to the pipe 34, thereby helping move the sludge.

An issue that arises in many conversions involve the space required for the SRD, located at the base of the center column and against the tank floor. A five-foot square cage usually surrounds the center column, connected to and rotatable with the rake arms, a cage of this size being an industry standard to connect to an industry standard drive mechanism. This is especially true for clarifiers on the order of about 130 feet diameter. If the center column has a diameter of four feet, the five-foot square cage will not be able to rotate around the SRD box. One possible solution would be to raise the rake arms upwardly (by about 27 inches) to clear the SRD, but with a limited sidewall depth of about 13 feet, and the positioning of the sludge collection box, the energy dissipating inlet and the feedwell, there typically is not sufficient vertical space to do this and properly configure the RAS pipes to maximize clarifier performance and minimize installation complexity. A solution according to the invention is to provide the cage with a larger size at bottom, the portion that rotates around the SRD. For example, a 7'4" square bottom portion (non-standard size for clarifier diameters of 30-200 feet) of the cage can be provided, transitioning to the standard five-foot square cage at a level above the SRD, so that the cage can freely rotate around the center column and the attached SRD. Typically with the conversion of the invention all submerged metal components of the clarifier are replaced, and the new rotating cage is simply fabricated with a wider bottom section than what is above the level of the SRD.

FIG. 7 is a plan section view indicating some of the construction details of the newly added sludge collection box 44. The collection box 44 preferably is rectangular and has an annular floor 44a that encircles the center column 20 and is sealed against that column, such as by neoprene seal material that rubs around the outside of the stationary column as the collection box 44 rotates along with the rake arms, riser pipes, etc.

As shown in FIGS. 7 and 8, sludge riser pipes 46b enter the collection box through the floor 44a. The sludge exits these riser pipes preferably near the bottom, and valves 46c can be provided for controlling the rate of sludge flow out of each pipe 46b into the interior of the sludge collection box. This can be via openings as shown in FIG. 8, the opening size of each valve being controlled by a tube fitted within each tube 46b, to either fully align an inner tube opening with the outer pipe opening, or partially align the openings, or close the valve by selecting a non-aligned position. As stated above, the bottom 44a of the sludge collection box is below the level of liquid in the clarifier tank, preferably at least two feet or so below, so that sludge will flow into the box 44 by hydraulic pressure head differential. The floor 44a of the collection box has a large central opening, somewhat larger than the exterior of the center column 20 which remains stationary relative to the rotating collection box. A seal is made, between the floor 44a and the column at 44d, and this may be with a flexible, durable material such as neoprene.

The sludge exits the collection box via the newly added sludge discharge downpipe 58 which is seen in the schematic plan view of FIG. 7. The downpipe is stationary, and the center column 20 is stationary. Openings are provided in the center column, indicated at 70 in FIG. 7, sufficient for flow of sludge inwardly toward the center of the column 20. The inside of the center column is sealed off at a level essentially at that of the collection box bottom 44a (or lower), allowing the sludge from the box simply to enter the center column, to flow across an annular floor 72 secured in sealed connections (as by welding) to the interior wall of the center column 20 and to the upper end of the sludge discharge downpipe 58. The sludge drops by gravity into the centrally located downpipe 58.

The center column of a suction duct clarifier nearly always serves as the influent column, as is depicted in the drawings, rather than separate, inner influent column being positioned inside the center column.

With the clarified conversion method and system of the invention, a suction duct clarifier is converted into a suction pipe clarifier at minimal cost, without the need for any penetration or demolition of concrete at the tank floor.

The above described preferred embodiments are intended to illustrate the principles of the invention, but not to limit its scope. Other embodiments and variations to these preferred embodiments will be apparent to those skilled in the art and may be made without departing from the spirit and scope of the invention as defined in the following claims.

We claim:

1. In a wastewater treatment system, a method for converting a suction duct clarifier to a suction pipe clarifier, comprising the steps of:

removing an existing sludge collection drum on the basin floor, thereby exposing a floor opening that leads to a horizontal under-floor RAS return pipe for sludge exit out of the clarifier, providing a series of sludge riser pipes on rake arms of the clarifier, positioned to collect raked sludge into the sludge riser pipes as the rake arms rotate around the clarifier, providing an elevated sludge collection box on a center/influent column of the clarifier, the elevated sludge collection box receiving upper ends of the sludge riser pipes, rotating along with the rake arms, sealed against the stationary center/influent column and having a floor positioned below the liquid level in the clarifier basin such that a liquid level of sludge in the collection box will be below the liquid level in the clarifier basin, providing a sludge discharge downpipe vertically within the center/influent column, the downpipe having an upper end adjacent to the sludge collection box and positioned to receive sludge from the sludge collection box, such that a flow path is provided for sludge from the sludge collection box into the sludge discharge downpipe to convey sludge from the collection box into the sludge discharge downpipe, isolated from influent wastewater in the center/influent column, the lower end of the sludge discharge downpipe including an elbow to turn sludge flow radially outwardly, and including securing the downpipe to a hole in a wall of the center/influent column in a sealed connection such that sludge can flow down through the sludge discharge downpipe and out through the hole in the center/influent column without mingling with influent wastewater, and installing a sludge transfer box at the bottom of the center column, sealed against the center column around the exit end of the sludge discharge downpipe, and at a bottom side of the sludge transfer box, sealed around the existing floor opening, whereby the clarifier is converted to a suction pipe clarifier without the need to penetrate the clarifier basin's floor.

2. A suction pipe clarifier system converted from a suction duct clarifier by the method of claim 1.

3. In a wastewater treatment system, a suction pipe clarifier converted from a suction duct clarifier, comprising:

a center column of the clarifier, serving as an influent column through which influent sludge rises to be dispersed into the clarifier, just outside the center column, a floor opening that leads to a horizontal under-floor RAS return pipe for sludge exit out of the clarifier, a series of sludge riser pipes on rake arms of the clarifier, positioned to collect raked sludge into the sludge riser pipes as the rake arms rotate around the clarifier basin, an elevated sludge collection box on the clarifier's center column, the elevated sludge collection box receiving upper ends of the sludge riser pipes, rotating along with the rake arms, sealed against the stationary center column and having a floor positioned sufficiently below the liquid level in the clarifier basin that the liquid level of sludge in the collection box is below the liquid level in the clarifier basin, a sludge discharge downpipe positioned vertically within the center column, the downpipe having an upper end adjacent to the sludge collection box and positioned to receive sludge from the sludge collection box, and with a sludge flow path leading from the sludge collection box into the sludge discharge downpipe to convey sludge from the collection box into the sludge discharge downpipe, isolated from influent wastewater in the center column, the lower end of the sludge discharge downpipe including an elbow to turn sludge flow radially outwardly, and an outer end of the elbow being secured to the center column at a hole through the center column in a sealed connection such that sludge can flow down through the sludge discharge downpipe and out through the hole in the column without mingling with influent wastewater, and a sludge transfer box at the bottom of the center column, sealed against the center column around the exit end of the sludge discharge downpipe, and at a bottom side of the sludge transfer box, sealed around the floor opening, whereby the converted suction pipe clarifier utilizes an existing floor opening and under-floor RAS return pipe without any newly formed penetration in the clarifier basin's floor.

4. In a suction pipe clarifier of a wastewater treatment system, the clarifier including a tank with a tank floor and a center column, with a floor opening positioned adjacent to and outward from the center column, the floor opening leading to a horizontal under-floor RAS return pipe for sludge exit out of the clarifier, and further including a sludge discharge downpipe positioned within the center column, the improvement comprising:

the sludge discharge downpipe having an open lower end turning outwardly and extending to outside of the center column, a sludge transfer box secured and sealed to the outside of the center column so as to enclose the lower end of the downpipe and to receive sludge from the downpipe, and the sludge transfer box being secured to and in sealed connection with the floor surrounding said floor opening of the tank, whereby the sludge transfer box receives sludge from the elbow at the lower end of the downpipe and transfers the sludge down through the floor opening to the under-floor RAS return pipe for exit out of the clarifier.

* * * * *